United States Patent [19]

Franz

[11] 4,276,350

[45] Jun. 30, 1981

[54] FLUOROCARBON TREATMENT FOR REDUCING THE REACTIVITY OF A GLASS SURFACE AND PRODUCT

[75] Inventor: Helmut Franz, Pittsburgh, Pa.

[73] Assignee: PPG Industries, Inc., Pittsburgh, Pa.

[21] Appl. No.: 65,797

[22] Filed: Aug. 13, 1979

[51] Int. Cl.³ .............................................. B32B 17/00
[52] U.S. Cl. ..................................... 428/410; 65/30 E; 252/DIG. 10; 427/299; 428/426
[58] Field of Search ............... 427/299, 407 A, 407 F, 427/385 A, 444, 407.2, 412.4, 389.7; 428/410, 421, 426, 432; 65/30 E, 60 BC; 252/DIG. 10

[56] References Cited

U.S. PATENT DOCUMENTS

| | | | |
|---|---|---|---|
| 3,418,153 | 12/1968 | Levene | 428/421 |
| 3,420,693 | 1/1969 | Scholes et al. | 428/432 |
| 3,438,760 | 4/1969 | Loukes et al. | 65/30 E |
| 3,558,345 | 1/1971 | Baum | 427/299 |
| 3,926,604 | 12/1975 | Smay et al. | 427/407 A |
| 4,086,178 | 4/1978 | Walker | 252/DIG. 10 |
| 4,089,804 | 5/1978 | Falk | 252/355 |

Primary Examiner—Ronald H. Smith
Assistant Examiner—S. L. Childs
Attorney, Agent, or Firm—Donna L. Seidel

[57] ABSTRACT

A method is disclosed for reducing the reactivity of a glass surface by blocking reactive sites such as silanol groups at the glass surface with a molecular layer of fluorocarbon. The method involves adsorbing multivalent metal cations at the glass surface to provide anchoring sites for the chemisorption of otherwise nonreactive fluorocarbons.

10 Claims, No Drawings

FLUOROCARBON TREATMENT FOR REDUCING THE REACTIVITY OF A GLASS SURFACE AND PRODUCT

BACKGROUND OF THE INVENTION

1. Field of the Invention

The present invention relates generally to the art of treating glass surfaces and more particularly to the art of treating glass surfaces with fluorocarbons.

2. The Prior Art

Fluorocarbons are well-known for their chemical inertness and their ability to provide a lubricating protective coating for other materials. Useful applications include such common items as TEFLON ® polymeric fluorocarbon coated cookware and utensils. However, the same properties which make fluorocarbons desirable coating materials also make it difficult to form coatings from them. Since most chemical adhesives are ineffective to bond fluorocarbons, other techniques have been developed. For example, a fluorocarbon resin may be fusion bonded to a surface which has been mechanically or chemically etched.

In U.S. Pat. No. 3,558,345 Baum et al teach a method of bonding a fluorocarbon resin to the surface of a silicate glass having free silanol groups by means of an intermediate amino-functional silane coupling agent. The method involves cleaning the silicate glass surface, treating the cleaned surface with an amino-functional coupling agent, applying a fluorocarbon resin to the treated glass surface, and curing the resin at elevated temperatures.

SUMMARY OF THE INVENTION

The present invention provides a method for reducing the reactivity of glass surfaces, including typical soda-lime glass surfaces, by blocking reactive sites such as silanol groups at the glass surface with a molecular layer of a fluorocarbon. The glass surface is contacted with an aqueous solution comprising multivalent cations which are adsorbed onto the glass surface providing anchoring sites for chemisorption of the otherwise nonreactive flourocarbons. The metal cation treated glass surface is then contacted with a fluorocarbon which is chemisorbed at the glass surface providing a nonreactive surface layer.

DESCRIPTION OF THE PREFERRED EMBODIMENTS

The surface of a glass substrate such as a typical soda-lime-silica glass sheet is contacted with a solution of a salt containing multivalent cations which are adsorbed onto the glass surface. Such salts include the hydroxides of metals such as calcium, barium and strontium and the chlorides of metals such as chromium, aluminum, zinc, tin, zirconium, titanium, iron, copper and magnesium. The concentration of the salt in the solution may range from about 0.01 percent to saturation. Preferably, an aqueous solution of about 0.1 to 1.0 percent salt is applied. Preferred salts include chromic, ferric, stannic and zinc chlorides. The solution may be used at ambient temperature (about 25° C.) or at an elevated temperature up to the boiling point of the solution, preferably about 200° F. (about 93° C.). The glass surface is contacted with the solution for a sufficient time, typically from a few seconds to a few minutes, for the metal cations to be adsorbed by the glass surface.

Following adsorption of the metal cations, the glass surface is contacted with a solution of a flurocarbon compound which is chemisorbed by the glass surface. Useful fluorocarbon compounds include commercially available fluorocarbon surfactants. Preferred flurocarbons include ionic, saturated or slightly unsaturated fluorocarbons which contain carboxyl groups. The degree of carboxylation is characterized, for the purposes of the present invention, by infrared analysis of the ratio of COOH to $CF_2$ groups and is expressed as (log I COOH/log I $CF_2$)

wherein I is the ratio of the intensity of incident radiation to the intensity of emergent radiation for the given absorption band. A value of $\leq 0.2$ is characterized as slight carboxylation, $\geq 1.0$ as heavy carboxylation, and moderate carboxylation is characterized by values between 0.2 and 1.0. The absorption bands are measured at 6.1 microns for the carboxylate and 15.5 microns for the fluorocarbon.

The concentration of fluorocarbon in the solution may range from about 0.01 percent to saturation. Preferably, an aqueous solution of about 0.1 to 1.0 percent fluorocarbon is applied. The solution may be used at ambient temperature (about 25° C.) or at an elevated temperature up to the boiling point of the solution. The solution is preferably applied at ambient temperature. The glass surface with the adsorbed metal ions is contacted with the fluorocarbon solution for a sufficient time, typically from a few seconds to a few minutes, for chemisorption of the fluorocarbon to occur.

The chemisorption of a fluorocarbon by a metal cation treated glass surface provides the glass article with a non-wettable lubricated low energy surface from which organic polymers may be readily separated. Such an article is useful as a mold for casting polymer sheets or as a releasable pressing plate for laminating a polymer sheet to another glass sheet. The present invention will be further understood from the description of specific examples which follow.

EXAMPLE I

A typical soda-lime-silica glass surface is contacted for 1 minute with an aqueous solution of 1 percent by weight chromic chloride at a temperature of 200° F. (about 93° C.). The metal cation treated glass surface is then contacted for 1 minute with an aqueous solution of 1 percent by weight of fluorocarbon which is chemisorbed by the metal cation treated glass surface. The fluorocarbon is an anionic, saturated, moderately carboxylated fluorocarbon surfactant and is available from DuPont as "Zonyl" FSP, which is 35 percent fluorocarbon in an isopropanol/water dilutent. The resultant fluorocarbon treated surface is repellent to both water and organic solvents.

EXAMPLE II

A glass surface is treated as in Example I except that the fluorocarbon is a cationic, slightly unsaturated, moderately carboxylated fluorocarbon surfactant available from DuPont as "Zonyl" FSC, which is 50 percent fluorocarbon in an isopropanol/water diluent. The treated surface shows the same repellency as in Example I.

EXAMPLE III

A glass surface is treated as in the previous examples with an amphoteric, slightly unsaturated, heavily carboxylated fluorocarbon surfactant available from DuPont as "Zonyl" FSB, which is 40 percent fluorocarbon in an isopropanol/water diluent. The treated surface is water and organic solvent repellent as in the previous examples.

EXAMPLE IV

A glass surface is treated for 1 minute at ambient temperature with an aqueous solution of 1 percent chromic chloride. The metal cation treated surface is then contacted for 1 minute at ambient temperature with a 1 percent aqueous solution of a moderately carboxylated fluorocarbon available from 3M Corporation as FC-807 Scotchban ® Paper Protector. The treated glass surface is repellent as in the previous examples.

The above examples are offered to illustrate the present invention. Various modifications which may be made by ones skilled in the art are included within the scope of the invention. For example, other treatment parameters with respect to time, temperature and concentration may be employed. As can be seen from the examples, the fluorocarbons useful according to the present invention are not limited by ionic type but only by the characteristic of being chemisorbed by a metal cation treated glass surface. The scope of invention is defined by the following claims.

I claim:

1. A method for treating a glass surface comprising the steps of:
   a. contacting the glass surface with a solution comprising multivalent metal cations capable of adsorption onto the glass surface at a temperature below the boiling point of the solution; and
   b. contacting the glass surface, subsequent to the adsorption of the multivalent metal cations, with a fluorocarbon capable of chemisorption by the metal cation treated glass surface.

2. The method according to claim 1, wherein the glass surface is contacted with an aqueous solution of a salt containing multivalent cations of a metal selected from the group consisting of calcium, magnesium, barium, aluminum, strontium, chromium, copper, tin, iron, titanium, zirconium, and zinc.

3. The method according to claim 2 wherein the salt is selected from the group consisting of chromic, stannic and ferric chlorides.

4. The method according to claim 1 wherein the fluorocarbon is an ionic fluorocarbon surfactant.

5. The method according to claim 4, wherein the fluorocarbon surfactant contains carboxyl groups.

6. The method according to claim 5 wherein the fluorocarbon surfactant is an anionic, saturated, moderately carboxylated fluorocarbon.

7. The method according to claim 5 wherein the fluorocarbon surfactant is slightly unsaturated.

8. The method according to claim 7 wherein the fluorocarbon surfactant is a cationic, moderately carboxylated fluorocarbon.

9. The method according to claim 7 wherein the fluorocarbon surfactant is an amphoteric, heavily carboxylated fluorocarbon.

10. A glass article produced according to the method of claim 1.

* * * * *